US012723138B2

(12) United States Patent
Kusudo et al.

(10) Patent No.: US 12,723,138 B2
(45) Date of Patent: Sep. 1, 2026

(54) WATERPROOFING SHEET FOR CIVIL ENGINEERING USE

(71) Applicant: KURARAY CO., LTD., Kurashiki (JP)

(72) Inventors: Kazumasa Kusudo, Okayama (JP); Hiroyuki Kawai, Saijo (JP); Takashi Katayama, Tokyo (JP); Shuhei Yorimitsu, Okayama (JP); Noriko Kawashima, Tokyo (JP); Daisuke Konishi, Kamisu (JP); Naoyuki Yaguchi, Kokubunji (JP); Kenichi Kojima, Kokubunji (JP)

(73) Assignee: KURARAY CO., LTD., Kurashiki (JP)

( * ) Notice: Subject to any disclaimer, the term of this patent is extended or adjusted under 35 U.S.C. 154(b) by 551 days.

(21) Appl. No.: 17/799,724

(22) PCT Filed: Feb. 4, 2021

(86) PCT No.: PCT/JP2021/004164

§ 371 (c)(1),
(2) Date: Aug. 15, 2022

(87) PCT Pub. No.: WO2021/171955

PCT Pub. Date: Sep. 2, 2021

(65) Prior Publication Data

US 2023/0075020 A1 Mar. 9, 2023

(30) Foreign Application Priority Data

Feb. 27, 2020 (JP) ................................ 2020-032143

(51) Int. Cl.

| | |
|---|---|
| ***C08J 7/04*** | (2020.01) |
| ***B29C 48/00*** | (2019.01) |
| ***B29K 23/00*** | (2006.01) |
| ***B32B 27/08*** | (2006.01) |
| ***B32B 27/30*** | (2006.01) |
| ***B32B 27/32*** | (2006.01) |
| ***C09D 1/00*** | (2006.01) |

(52) U.S. Cl.

CPC ............... *C08J 7/04* (2013.01); *B29C 48/022* (2019.02); *B32B 27/08* (2013.01); *B32B 27/302* (2013.01); *B32B 27/306* (2013.01); *B32B 27/32* (2013.01); *C09D 1/00* (2013.01); *B29K 2023/083* (2013.01); *B32B 2250/246* (2013.01); *B32B 2255/10* (2013.01); *B32B 2255/20* (2013.01); *B32B 2270/00* (2013.01); *B32B 2307/54* (2013.01); *B32B 2307/7265* (2013.01); *B32B 2419/00* (2013.01); *C08J 2323/08* (2013.01)

(58) Field of Classification Search

CPC ......... B32B 27/302; B32B 27/306; C09J 7/04
See application file for complete search history.

(56) References Cited

U.S. PATENT DOCUMENTS

| | | | | |
|---|---|---|---|---|
| 5,352,739 | A | 10/1994 | Arjunan | |
| 2004/0122409 | A1 * | 6/2004 | Thomas | C08L 23/0815 604/385.24 |
| 2010/0167047 | A1 | 7/2010 | Ise et al. | |
| 2012/0035313 | A1 | 2/2012 | Vignola | |
| 2015/0187977 | A1 | 7/2015 | Tsujimura et al. | |
| 2015/0231863 | A1 * | 8/2015 | Knebel | B32B 5/022 428/355 R |

FOREIGN PATENT DOCUMENTS

| | | | |
|---|---|---|---|
| CN | 106633357 | A | 5/2017 |
| JP | H09-52330 | A | 2/1997 |
| JP | 2001115791 | A | 4/2001 |
| JP | 3298306 | B2 | 7/2002 |
| JP | 2002294015 | A | 10/2002 |
| JP | 2008012915 | A | 1/2008 |
| JP | 2012102593 | A | 5/2012 |
| JP | 2013087492 | A | 5/2013 |
| JP | 2014166723 | A | 9/2014 |
| JP | 2016069862 | A | 5/2016 |
| KR | 1020180098526 | A | 9/2018 |
| WO | WO-2007142200 | A1 | 12/2007 |
| WO | WO-2013190823 | A1 | 12/2013 |

OTHER PUBLICATIONS

Machine translation for CN 106633357. (Year: 2017).*
Machine translation for JP 2013087492. (Year: 2013).*
Karsli, G. et. al., "A Study on Compatibility of SEBS/EVA Blends Prepared by Different Techniques," 2011, KGK Kautschuk, Gummi , Kunststoffe, vol. 64, Issue 7-8, pp. 15-18. (Year: 2011).*
International Search Report issued Apr. 6, 2021 in PCT/JP2021/004164 (with English translation).
Extended European Search Report issued Mar. 19, 2024 in corresponding European Patent Application No. 21761422.1, 6 pages.

* cited by examiner

*Primary Examiner* — Peter Y Choi
(74) *Attorney, Agent, or Firm* — Element IP, PLC

(57) ABSTRACT

To provide a waterproof sheet for civil engineering, having sufficient strength and elongation even at a low temperature of about −10° C. and having excellent adhesiveness to a structure such as a tunnel. Disclosed is a waterproof sheet for civil engineering, which has a layer (A) including a composition containing an ethylene-vinyl acetate copolymer (a1) and a thermoplastic resin (a2) other than the ethylene-vinyl acetate copolymer (a1), and a silica-containing layer containing silica, wherein the content of the ethylene-vinyl acetate copolymer (a1) in the composition is 30 to 95% by mass, the content of the thermoplastic resin (a2) is 5 to 70% by mass, and the absolute value of the difference between the SP value of the ethylene-vinyl acetate copolymer (a1) and the SP value of the thermoplastic resin (a2) is less than 0.70 $(cal/cm^3)^{1/2}$.

18 Claims, No Drawings

WATERPROOFING SHEET FOR CIVIL ENGINEERING USE

TECHNICAL FIELD

The present invention relates to a waterproof sheet for civil engineering to prevent water leakage from the ground to the inside of a tunnel or the like in civil engineering work such as a tunnel.

BACKGROUND ART

Conventionally, in underground tunnel construction in urban areas, waterproof sheets made of rubber or synthetic resin have been used in order to prevent leakage of water from the ground to the inside of the tunnel. Specifically, PTL 1 proposes a waterproof sheet composed of a vinyl chloride-based or olefin-based thermoplastic resin. Further, PTL 2 proposes a waterproof sheet composed of an ethylene-vinyl acetate copolymer, and PTL 3 proposes a waterproof sheet composed of an ethylene-propylene random copolymer.

However, since none of these waterproof sheets is in close contact with a concrete structure built in the inside thereof, there has been a problem that water seeped out from the natural ground or the ground moves through a gap between the waterproof sheet and the concrete structure, and enters the inside of the structure through a crack in the concrete structure from a defective joint part or a broken part of the waterproof sheet to leak water.

In order to solve this problem, PTL 4 proposes an adhesive waterproof sheet that is installed between a concrete structure and the ground and chemically adheres to the concrete structure after construction to prevent water running between the waterproof sheet and the concrete structure, and an ethylene-vinyl acetate copolymer composition is used as a material constituting the waterproof sheet.

In addition, PTL 5 proposes a synthetic resin waterproof sheet having a silica-containing surface layer containing silica having a silicon dioxide content of 90% by mass or more at a ratio of 30 to 200 $mg/cm^3$.

It should be noted that PTL 4 and PTL 5 describe that an ethylene-vinyl acetate copolymer or the like may be mixed with other resins to be used, but do not describe that these resins are used so that their compatibility with each other satisfies a specific relationship during mixing.

CITATION LIST

Patent Literature

PTL 1: JP 3298306 B
PTL 2: JP 2001-115791 A
PTL 3: JP 9-52330 A
PTL 4: JP 2002-294015 A
PTL 5: WO2007/142200 A

SUMMARY OF INVENTION

Technical Problem

According to the inventions described in PTL 4 and PTL 5, it is possible to prevent water seeped out from the ground from entering the inside of the concrete structure and leaking. However, in recent years, underground structures such as tunnels are often constructed at a great depth, and since the pressure of the water that seeps out is high, the waterproof sheet is required to have further excellent elongation and strength. Further, particularly in the case of a road tunnel or the like which adopts a strict standard for temperature conditions, it is required to exhibit performance equal to or higher than that of the conventional one even under a low temperature (for example, about −10° C.) environment, so that further improvement is required.

The present invention has been made in view of the above-described conventional problems, and an object thereof is to provide a waterproof sheet for civil engineering, having sufficient strength and elongation even at a low temperature of about −10° C. and having excellent adhesiveness to a structure such as a tunnel.

Solution to Problem

As a result of intensive studies in view of the above-described problems, the present inventors have found that the above-described problems can be solved by using an ethylene-vinyl acetate copolymer and a thermoplastic resin other than the ethylene-vinyl acetate copolymer in specific contents and adjusting the absolute value of the difference between the SP values, which is a standard for the compatibility of both, to be within a specific range.

That is, the present invention relates to the following [1] to [9].

[1] A waterproof sheet for civil engineering, which has a layer (A) including a composition containing an ethylene-vinyl acetate copolymer (a1) and a thermoplastic resin (a2) other than the ethylene-vinyl acetate copolymer (a1), and a silica-containing layer containing silica, wherein the content of the ethylene-vinyl acetate copolymer (a1) in the composition is 30 to 95% by mass, the content of the thermoplastic resin (a2) is 5 to 70% by mass, and the absolute value of the difference between the SP value of the ethylene-vinyl acetate copolymer (a1) and the SP value of the thermoplastic resin (a2) is less than 0.70 $(cal/cm^3)^{1/2}$.

[2] The waterproof sheet for civil engineering as set forth in [1], wherein the layer (A) has a mass change rate of 0.6 to 5.0% when immersed in toluene at 23° C. for 1 minute.

[3] The waterproof sheet for civil engineering as set forth in [1] or [2], wherein the thermoplastic resin (a2) has a tensile elongation at −10° C. of 500% or more.

[4] The waterproof sheet for civil engineering as set forth in any one of [1] to [3], wherein the content ratio of the structural unit derived from vinyl acetate in the composition is 5% by mass or more and less than 30% by mass.

[5] The waterproof sheet for civil engineering as set forth in any one of [1] to [4], wherein the thermoplastic resin (a2) is a thermoplastic elastomer resin or a polyolefin-based resin.

[6] The waterproof sheet for civil engineering as set forth in [5], wherein the thermoplastic elastomer resin is a styrene-based elastomer or an olefin-based elastomer.

[7] The waterproof sheet for civil engineering as set forth in any one of [1] to [6], further having a layer (B) containing a synthetic resin, wherein the layer (B) and the layer (A) are adjacent to each other.

[8] The waterproof sheet for civil engineering as set forth in [7], wherein the synthetic resin is an ethylene-vinyl acetate copolymer.

[9] The waterproof sheet for civil engineering as set forth in any one of [1] to [8], wherein a tensile elongation at break at −10° C. of the waterproof sheet for civil engineering is 480% or more.

Advantageous Effects of Invention

According to the present invention, it is possible to provide the waterproof sheet for civil engineering, having sufficient strength and elongation even at a low temperature of about −10° C. and having excellent adhesiveness to a structure such as a tunnel.

DESCRIPTION OF EMBODIMENTS

[Waterproof Sheet for Civil Engineering]

The waterproof sheet for civil engineering of the present invention is characterized by having a layer (A) including a composition containing an ethylene-vinyl acetate copolymer (a1) and a thermoplastic resin (a2) other than the ethylene-vinyl acetate copolymer (a1) (hereinafter also referred to simply as "thermoplastic resin (a2)"), and a silica-containing layer containing silica, wherein the content of the ethylene-vinyl acetate copolymer (a1) in the composition is 30 to 95% by mass, the content of the thermoplastic resin (a2) is 5 to 70% by mass, and the absolute value of the difference between the SP value of the ethylene-vinyl acetate copolymer (a1) and the SP value of the thermoplastic resin (a2) is less than 0.70 $(cal/cm^3)^{1/2}$.

In the present invention, the SP value (solubility parameter) is calculated based on D. W. Van Krevelen's estimation method, and the estimation method is calculated based on the cohesive energy density and the molar molecular volume (D. W. Van Krevelen, Klaaste Nijenhuis, "Properties of Polymers, Fourth Edition" Elsevier Science, 2009).

In the present invention, since the content of the ethylene-vinyl acetate copolymer (a1) and the content of the thermoplastic resin (a2) in the composition constituting the layer (A) are adjusted to 30 to 95% by mass and 5 to 70% by mass, respectively, the elongation of the waterproof sheet for civil engineering is improved even at a low temperature of about −10° C., and the adhesiveness to a structure such as a tunnel is also improved. From this viewpoint, the content of the ethylene-vinyl acetate copolymer (a1) is preferably 35 to 95% by mass, more preferably 40 to 90% by mass, and still more preferably 42 to 85% by mass.

On the other hand, the content of the thermoplastic resin (a2) is preferably 5 to 65% by mass, more preferably 10 to 60% by mass, and still more preferably 15 to 58% by mass.

The present invention is also characterized in that the absolute value of the difference between the SP value of the ethylene-vinyl acetate copolymer (a1) and the SP value of the thermoplastic resin (a2) is less than 0.70 $(cal/cm^3)^{1/2}$. When the absolute value of the difference between the SP values is 0.70 $(cal/cm^3)^{1/2}$ or more, the compatibility between the ethylene-vinyl acetate copolymer and the thermoplastic resin is deteriorated, and as a result, the elongation at a low temperature of about −10° C. is deteriorated. From the viewpoint of obtaining a waterproof sheet for civil engineering which exhibits excellent elongation even at a low temperature, the absolute value of the difference between the SP value of the ethylene-vinyl acetate copolymer (a1) and the SP value of the thermoplastic resin (a2) is preferably 0.60 $(cal/cm^3)^{1/2}$ or less, more preferably 0.50 $(cal/cm^3)^{1/2}$ or less, still more preferably 0.40 $(cal/cm^3)^{1/2}$ or less, even more preferably 0.35 $(cal/cm^3)^{1/2}$ or less, and yet still more preferably 0.30 $(cal/cm^3)^{1/2}$ or less. It is presumed that when the absolute value of the difference between the SP values is within the above range, the compatibility between the ethylene-vinyl acetate copolymer (a1) and the thermoplastic resin (a2) is improved to form a fine sea-island structure, and as a result, the elongation of the waterproof sheet for civil engineering is improved and the waterproof property is also improved.

When a plurality of ethylene-vinyl acetate copolymers (a1) and a plurality of thermoplastic resins (a2) are used, the absolute values of the differences between each ethylene-vinyl acetate copolymer (a1) and each thermoplastic resin (a2) are all calculated, and the largest value is taken as the "absolute value of the difference".

Further, in the present invention, from the same viewpoint as described above, the absolute value of the difference between the SP value considering the weighted average value in the ethylene-vinyl acetate copolymer (a1) and the SP value considering the weighted average value in the thermoplastic resin (a2) is preferably less than 0.70 $(cal/cm^3)^{1/2}$, more preferably 0.60 $(cal/cm^3)^{1/2}$ or less, still more preferably 0.50 $(cal/cm^3)^{1/2}$ or less, and even more preferably 0.10 $(cal/cm^3)^{1/2}$ or less.

Furthermore, in the present invention, from the same viewpoint as described above, the absolute value of the difference in SP value between the resin having the maximum SP value and the resin having the minimum SP value in the composition is preferably less than 0.70 $(cal/cm^3)^{1/2}$, more preferably 0.60 $(cal/cm^3)^{1/2}$ or less, still more preferably 0.50 $(cal/cm^3)^{1/2}$ or less, and even more preferably 0.40 $(cal/cm^3)^{1/2}$ or less.

<Composition Constituting Layer (A)>

The layer (A) constituting the waterproof sheet for civil engineering of the present invention includes a composition containing an ethylene-vinyl acetate copolymer (a1) and a thermoplastic resin (a2) other than the ethylene-vinyl acetate copolymer (a1).

[Ethylene-Vinyl Acetate Copolymer (a1)]

As the ethylene-vinyl acetate copolymer (a1) used in the layer (A), the content ratio (VA ratio) of the vinyl acetate-derived structural unit in the copolymer is preferably 5 to 55% by mass, and more preferably 10 to 50% by mass. When the content of the vinyl acetate-derived structural unit in the ethylene-vinyl acetate copolymer is within the above range, the tensile elongation at a low temperature is improved.

The SP value of the ethylene-vinyl acetate copolymer (a1) is preferably 4.0 to 10.0 $(cal/cm^3)^{1/2}$, more preferably 5.0 to 9.5 $(cal/cm^3)^{1/2}$, and still more preferably 6.0 to 9.0 $(cal/cm^3)^{1/2}$. When the SP value of the ethylene-vinyl acetate copolymer (a1) is within the above range, the absolute value of the difference between the SP values can be easily adjusted within the above range, and the compatibility with the thermoplastic resin (a2) can be easily improved.

The MFR (melt flow rate) of the ethylene-vinyl acetate copolymer (a1) is preferably 0.5 to 20.0 g/10 min, more preferably 1.0 to 10.0 g/10 min, and still more preferably 1.2 to 5.0 g/10 min. When the MFR is within the above range, a waterproof sheet for civil engineering having excellent stress can be obtained even at a low temperature.

The tensile elongation at −10° C. of the ethylene-vinyl acetate copolymer (a1) is preferably 200% or more. When the tensile elongation at −10° C. is equal to or greater than the above lower limit value, the waterproof sheet for civil engineering containing the ethylene-vinyl acetate copolymer (a1) is less likely to break during construction because the sheet has a sufficient elongation even at a low temperature. From this viewpoint, the tensile elongation at −10° C. is more preferably 250% or more, and still more preferably 300% or more.

The tensile elongation of the ethylene-vinyl acetate copolymer (a1) in the description herein can be measured by the method described in Examples.

In the ethylene-vinyl acetate copolymer (a1) used in the present invention, in addition to ethylene and vinyl acetate, a copolymer containing vinyl alcohol produced by hydrolyzing a part of vinyl acetate is also included in the ethylene-vinyl acetate copolymer (a1) of the present application. The vinyl acetate content ratio in this case is defined as the total amount of vinyl acetate and vinyl alcohol in the copolymer, and defines the vinyl acetate content ratio.

Examples of commercially available products of the ethylene-vinyl acetate copolymer (a1) which can be used in the present invention include "EVAFLEX" (trade name, registered trademark) manufactured by Dow-Mitsui Polychemicals Company, Ltd., "Ultrathene" (trade name, registered trademark) manufactured by Tosoh Corporation, "UBE Polyethylene" (trade name, registered trademark) manufactured by Ube Industries, Ltd., "Suntec" (trade name, registered trademark) manufactured by Asahi Kasei Corporation, and "ethylene-vinyl acetate copolymer NUC" (brand name) manufactured by ENEOS NUC Corporation.

[Thermoplastic Resin (a2) Other than Ethylene-Vinyl Acetate Copolymer (a1)]

The thermoplastic resin (a2) other than the ethylene-vinyl acetate copolymer (a1) constituting the layer (A) in the present invention is preferably a thermoplastic elastomer resin or a polyolefin-based resin from the viewpoint of improving the compatibility with the ethylene-vinyl acetate copolymer.

Examples of the thermoplastic elastomer resin include styrene-based elastomers, olefin-based elastomers, diene-based elastomers, polyvinyl chloride-based thermoplastic elastomers, chlorinated polyethylene-based thermoplastic elastomers, polyurethane-based thermoplastic elastomers, polyester-based thermoplastic elastomers, polyamide-based thermoplastic elastomers, and fluororesin-based thermoplastic elastomers.

In the present invention, among these thermoplastic elastomers, a styrene-based elastomer or an olefin-based elastomer is particularly preferable from the viewpoint of balance between physical properties and processability.

Examples of the polyolefin-based resin include polyethylene such as linear low-density polyethylene and high-density polyethylene. Among these, linear low-density polyethylene is preferable from the viewpoint of improving the compatibility with the ethylene-vinyl acetate copolymer (a1).

The styrene-based elastomer has an aromatic vinyl-based polymer block (hard segment) and a rubber block (soft segment), and the aromatic vinyl-based polymer portion forms a physical cross-linking and the rubber block imparts elasticity.

Examples of the aromatic vinyl-based compound forming the aromatic vinyl-based polymer block include styrene; α-alkyl-substituted styrenes such as α-methylstyrene, α-ethylstyrene, and α-methyl-p-methylstyrene; nuclear alkyl-substituted styrenes such as o-methylstyrene, m-methylstyrene, p-methylstyrene, 2,4-dimethylstyrene, ethylstyrene, 2,4,6-trimethylstyrene, o-t-butylstyrene, p-t-butylstyrene, and p-cyclohexylstyrene; nuclear halogenated styrenes such as o-chlorostyrene, m-chlorostyrene, p-chlorostyrene, p-bromostyrene, and 2-methyl chlorostyrene; vinylnaphthalene derivatives such as 1-vinylnaphthalene; indene derivatives; and divinylbenzene.

Among these, styrene, α-methylstyrene, and p-methylstyrene are preferable, and styrene is more preferable.

These may be used alone, or two or more kinds thereof may be used in combination.

Examples of the styrene-based elastomer include, by the arrangement forms of soft segments, (β-farnesene)-styrene-butadiene-styrene-(β-farnesene) copolymer (FSBSF); styrene-butadiene-styrene block copolymer (SBS); styrene-isoprene-styrene block copolymer (SIS), styrene-isobutylene-styrene block copolymer (SIBS); styrene-ethylene/butylene-styrene block copolymer (SEBS); styrene-ethylene/propylene-styrene block copolymer (SEPS); a block copolymer of crystalline polyethylene and an ethylene/butylene-styrene random copolymer, obtained by hydrogenating a block copolymer of polybutadiene and a butadiene-styrene random copolymer; and a diblock copolymer of, e.g., crystalline polyethylene and polystyrene, obtained by hydrogenating a block copolymer of polystyrene and polybutadiene or an ethylene-butadiene random copolymer.

Among these, (β-farnesene)-styrene-butadiene-styrene-(β-farnesene) copolymer (FSBSF), styrene-isobutylene-styrene block copolymer (SIBS), styrene-ethylene/butylene-styrene block copolymer (SEBS), and styrene-ethylene/propylene-styrene block copolymer (SEPS) are preferable from the viewpoint of mechanical strength, heat-resistance stability, weather resistance, chemical resistance, gas barrier property, flexibility, processability, and the like, and (β-farnesene)-styrene-butadiene-styrene-(β-farnesene) copolymer (FSBSF) and styrene-ethylene/propylene-styrene block copolymer (SEPS) are more preferable. In addition, from the viewpoint of having excellent adhesiveness to a structure such as a tunnel, the styrene-based elastomer may be a mixture of (β-farnesene)-styrene-butadiene-styrene-(β-farnesene) copolymer (FSBSF) and styrene-ethylene/propylene-styrene block (SEPS). The content of the styrene block in these styrene-based elastomers is preferably 10 to 70% by mass, and more preferably 12 to 40% by mass.

As the olefin-based elastomer, a thermoplastic elastomer in which ethylene-propylene rubber (EPDM, EPM) is finely dispersed in polyisobutylene, ethylene-propylene copolymer, ethylene-propylene-diene terpolymer, or polypropylene (PP) is preferable.

The weight average molecular weight of the thermoplastic resin (a2) is not particularly limited, but is preferably 5,000 or more and preferably 7,000 or more from the viewpoint of mechanical properties, moldability, and the like. In addition, the weight average molecular weight of the thermoplastic resin (a2) is preferably 250,000 or less, more preferably 200,000 or less, still more preferably 150,000 or less, and particularly preferably 120,000 or less.

In the description herein, the weight average molecular weight is a weight average molecular weight in terms of standard polystyrene obtained by gel permeation chromatography (GPC) measurement. Specifically, it can be measured by the method described in Examples.

The SP value of the thermoplastic resin (a2) is preferably 6.0 to 10.0 $(cal/cm^3)^{1/2}$, more preferably 7.0 to 9.5 $(cal/cm^3)^{1/2}$, and still more preferably 8.0 to 9.0 $(cal/cm^3)^{1/2}$. When the SP value of the thermoplastic resin (a2) is within the above range, the compatibility with the ethylene-vinyl acetate copolymer (a1) is improved.

The tensile elongation of the thermoplastic resin (a2) at −10° C. is preferably 500% or more. When the tensile elongation at −10° C. is equal to or greater than the lower limit value, the waterproof sheet for civil engineering containing the thermoplastic resin (a2) is less likely to break during construction because the sheet has a sufficient elongation even at a low temperature. From this viewpoint, the tensile elongation at −10° C. is more preferably 520% or more, still more preferably 540% or more, and even more preferably 560% or more.

It should be noted that the tensile elongation of the thermoplastic resin (a2) in the description herein can be measured by the method described in Examples.

[Other Components]

The composition constituting the layer (A) may contain other components such as inorganic fillers such as calcium carbonates, pigments, flame retardants, plasticizers in addition to the ethylene-vinyl acetate copolymer (a1) and the thermoplastic resin (a2) other than the ethylene-vinyl acetate copolymer.

In the case where the composition constituting the layer (A) contains the other components, the content thereof in the composition is preferably 30% by mass or less, more preferably 20% by mass or less, and still more preferably 10% by mass or less.

When the content of the other components is equal to or less than the upper limit value, the amount of the ethylene-vinyl acetate copolymer (a1) and the amount of the thermoplastic resin (a2) other than the ethylene-vinyl acetate copolymer are relatively increased, and thus the tensile elongation at a low temperature is easily improved.

<Method for Producing Layer (A)>

In the present invention, the method for producing the layer (A) is not particularly limited. In general, there may be mentioned a method in which the composition constituting the layer (A) is melt-extruded to form a sheet with a T-die and a method in which the composition is formed into a sheet with a calender roll.

<Characteristics of Layer (A)>

The content ratio (VA ratio) of the structural unit derived from vinyl acetate in the composition used for the layer (A) is preferably 5 to 50% by mass, more preferably 5 to 40% by mass, still more preferably 5% by mass or more and less than 30% by mass, and even more preferably 7% by mass or more and less than 30% by mass. When the content of the structural unit derived from vinyl acetate in the composition is within the above range, the tensile elongation at a low temperature is improved.

A mass change rate when the layer (A) is immersed in toluene at 23° C. for 1 minute is preferably 0.6 to 5.0%. When the mass change rate is within the above range, mortar adhesiveness can be improved. From this viewpoint, the mass change rate is preferably 0.7 to 4.0%, more preferably 0.8 to 3.0%, and still more preferably 0.8 to 2.0%.

The mass change rate can be measured by the method described in Examples.

The layer (A) preferably has a thickness of 0.01 to 0.8 mm. When the thickness of the layer (A) is within the above range, the tensile stress and elongation can be improved while maintaining the strength. From these viewpoints, the thickness of the layer (A) is preferably 0.05 to 0.5 mm, and more preferably 0.07 to 0.4 mm.

<Silica-Containing Layer>

The waterproof sheet for civil engineering of the present invention has a silica-containing layer containing silica in addition to the layer (A). In the waterproof sheet for civil engineering of the present invention, the silica-containing layer is provided on the surface to be bonded to the concrete structure, and when the waterproof sheet for civil engineering and the concrete structure are bonded to each other, they can be firmly bonded to each other by a water curing reaction in the concrete.

From the viewpoint of improving the adhesiveness between the silica-containing layer and the concrete structure, the silica used in the silica-containing layer preferably has a silicon dioxide content of 90% by mass or more, and more preferably 92% by mass or more.

Further, the silica preferably has a BET specific surface area of 80 $m^2/g$ or more, and more preferably 90 $m^2/g$ or more. When the BET specific surface area of the silica is 80 $m^2/g$ or more, the contact area between the silica-containing layer and the concrete structure is improved, so that the adhesive force is improved.

The content of the silica in the silica-containing layer is preferably 0.1 to 20 $g/m^2$, more preferably 0.15 to 10 $g/m^2$, and still more preferably 0.25 to 3 $g/m^2$. When the content of the silica in the silica-containing layer is within the above range, the number of contact points between the silica-containing layer and the concrete structure is increased, so that the waterproof sheet for civil engineering and the concrete structure are more firmly bonded to each other.

The mass ratio of the amount of silica to the amount of resin constituting the silica-containing layer [(amount of silica)/(amount of resin)] is preferably 10/90 to 90/10, and more preferably 30/70 to 70/30.

As the silica used in the present invention, silica produced by a wet method, a dry method, an electric arc method or the like can be used, but from the viewpoint of improving the adhesiveness between the silica-containing layer and the concrete structure, silica produced by a wet method is preferable.

As the resin constituting the silica-containing layer, an ethylene-vinyl acetate copolymer is preferable. When the ethylene-vinyl acetate copolymer is used, the content of the structural unit derived from vinyl acetate is preferably 30% by mass or more, and more preferably 35% by mass or more. When the amount of the structural unit derived from vinyl acetate is equal to or greater than the lower limit value, the adhesiveness to the concrete structure is improved.

Examples of the method for producing the waterproof sheet for civil engineering of the present invention include a method in which a silica dispersion liquid is prepared by dispersing the silica in an organic solvent having a dissolving action on the resin constituting the layer (A), and then the layer (A) is coated with the silica dispersion liquid, followed by heating and drying.

Examples of the organic solvent used for preparing the silica dispersion liquid include toluene, xylene, ethyl acetate, tetrahydrofuran, and methyl ethyl ketone.

The coating amount of the dispersion liquid on the layer (A) is usually preferably 2 to 200 $g/m^2$, more preferably 3 to 100 $g/m^2$, and still more preferably 5 to 30 $g/m^2$. When the coating amount is within the above range, processability and strength of the silica-containing layer are secured.

Other examples of the production method include a method in which the resin composition constituting the silica-containing layer and the resin composition constituting the layer (A) are subjected to co-extrusion molding or co-calendering.

The silica-containing layer preferably has a thickness of 2 to 100 μm. When the thickness of the silica-containing layer is within the above range, the strength of the silica-containing layer is improved, and the adhesive strength with the concrete structure is improved. From this viewpoint, the thickness of the silica-containing layer is preferably 5 to 50 μm, and more preferably 8 to 20 μm.

<Layer (B)>

The waterproof sheet for civil engineering of the present invention may include only the layer (A) and the silica-containing layer, but it is preferable to have a layer (B) containing a synthetic resin in addition to the layer (A) and the silica-containing layer for the purpose of increasing the strength of the waterproof sheet for civil engineering and improving the waterproof property, and from the viewpoint of further improving the waterproof property of the waterproof sheet for civil engineering, it is preferable that the layer (B) and the layer (A) are adjacent to each other, and it is more preferable that the layer (B), the layer (A), and the silica-containing layer are provided in this order.

As the synthetic resin constituting the layer (B), one or more selected from ethylene-vinyl acetate copolymer, polyvinyl chloride, ECB (ethylene copolymer bitumen), urethane-based resin, olefin-based resin, and the like can be used, but ethylene-vinyl acetate copolymer is preferable from the viewpoint of improving tensile elongation at a low temperature, from the viewpoint of easy processing by an extruder, a calender roll or the like, and from the viewpoint of easy adjustment of physical properties by the content of vinyl acetate group.

The layer (B) preferably has a thickness of 0.1 to 2.0 mm. When the thickness of the layer (B) is within the above range, the strength and waterproof property of the waterproof sheet for civil engineering are improved. From these viewpoints, the thickness of the layer (B) is preferably 0.2 to 1.0 mm, and more preferably 0.3 to 0.8 mm.

<Tensile Elongation of Waterproof Sheet for Civil Engineering>

The waterproof sheet for civil engineering of the present invention preferably has a tensile elongation at −10° C. of 480% or more. When the tensile elongation at −10° C. is equal to or greater than the lower limit value, the waterproof sheet for civil engineering is less likely to break during construction because the sheet has a sufficient elongation even at a low temperature. From this viewpoint, the tensile elongation at −10° C. is more preferably 500% or more, still more preferably 520% or more, and even more preferably 540% or more.

It should be noted that the tensile elongation of the waterproof sheet for civil engineering in the description herein can be measured by the method described in Examples.

<Tensile Stress of Waterproof Sheet for Civil Engineering>

The waterproof sheet for civil engineering of the present invention preferably has a tensile stress at −10° C. of 25 MPa or more. When the tensile stress at −10° C. is equal to or greater than the lower limit value, the sheet has a sufficient strength even at a low temperature, which improves the waterproof property of the waterproof sheet for civil engineering and the sheet is less likely to break during construction. From this viewpoint, the tensile stress at −10° C. is more preferably 30 MPa or more, still more preferably 35 MPa or more, and even more preferably 40 MPa or more.

It should be noted that the tensile stress of the waterproof sheet for civil engineering in the description herein can be measured by the method described in Examples.

EXAMPLES

Hereinafter, the present invention will be described with reference to Examples, but the present invention is not limited to these Examples.

<Method for Measuring Weight Average Molecular Weight of Thermoplastic Resin (a2)>

The weight average molecular weight of the thermoplastic resin (a2) was determined by GPC (gel permeation chromatography) based on the molecular weight in terms of standard polystyrene. The measuring apparatus and conditions are as follows.

Apparatus: GPC apparatus "HLC-8320GPC" (manufactured by Tosoh Corporation)

Separation column: Column "TSKgelSuperHZ4000" manufactured by Tosoh Corporation

Eluent: tetrahydrofuran

Eluent flow rate: 0.7 mL/min

Sample concentration: 5 mg/10 mL

Column temperature: 40° C.

<Tensile Elongation of Ethylene-Vinyl Acetate Copolymer (a1) and Thermoplastic Resin (a2) at −10° C. Condition>

A sheet made of an ethylene-vinyl acetate copolymer (a1) or a thermoplastic resin (a2) and having a length of 10 m, a width of 30 cm, and a thickness of 0.8 mm was prepared. Using the obtained sheet, the elongation was measured according to the method described in JIS K7161-1:2014.

<Mass Change Rate of Layer (A) when Immersed in Toluene>

The measurement was performed based on the method described in JIS K7114:2001. Specifically, the obtained layer (A) was immersed in toluene at 23° C. for 1 minute, and then the mass change rate was calculated from the mass of the dried layer (A) and that of the layer (A) before treatment.

<Tensile Test of Waterproof Sheet for Civil Engineering at −10° C. Condition>

The stress and elongation were measured according to the method described in JIS K7161-1:2014.

<Mortar Adhesiveness of Waterproof Sheet for Civil Engineering>

(i) Ordinary Portland cement (ordinary Portland cement manufactured by TAIHEIYO CEMENT CORPORATION) and dried Toyoura standard sand were well mixed at a ratio of sand:cement=2:1 (mass ratio), to which 0.5 parts by mass of water was added and well stirred to prepare a mortar liquid.

(ii) A rectangular test piece having a width×length=4 cm×16 cm was cut and collected along the length direction from a waterproof sheet, and the test piece was laid on the bottom of a mold having a width×length×depth=4 cm×16 cm×4 cm with the surface to which the mortar is to be bonded facing upward, and the mortar liquid prepared in (i) above was poured onto the test piece, and after the air bubbles in the mortar were removed by stirring and vibration, the whole mold was placed in an airtight container so that moisture did not evaporate, and the test piece was cured at 20° C. for 28 days.

(iii) After completion of curing, the mortar piece to which the waterproof sheet had been bonded was taken out from the mold, the side to which the waterproof sheet had been bonded was faced up, one end of the waterproof sheet in the length direction was peeled off from the mortar piece by 2 cm, and a piece (width×length=4 cm×20 cm) of polyester canvas (manufactured by Kuraray Co., Ltd.) "E5 base cloth" was firmly connected along the width direction of the peeled off end with a stapler so as not to come off. Thereafter, the sheet was peeled off at an angle of 180° at a speed of 10 mm/min until 2 cm of peeling progressed in the length direction of the sheet (excluding the length portion peeled off to connect the polyester canvas piece), the stress was continuously measured at that time, and the average peeling strength (N) was calculated from the chart after 2 cm of peeling was completed. Since the width of the test piece was 4 cm, the value calculated above was divided by 4 to obtain the stress (N/cm) at the time of peeling per 1 cm of width. Three test pieces were cut and collected per waterproof sheet and subjected to the same test as described above, and the average value of the three test pieces was used as the mortar adhesion force.

Production Example 1

A nitrogen-purged and dried pressure-resistant container was charged with 50.0 kg of cyclohexane as a solvent and 61.1 g of sec-butyllithium (10.5% by mass cyclohexane solution) (6.42 g of sec-butyllithium) as an anionic polymerization initiator, heated to 50° C. added with 0.81 kg of styrene and polymerized for 1 hour, subsequently added with 10.87 kg of isoprene and polymerized for 2 hours, further added with 0.81 kg of styrene and polymerized for 1 hour to obtain a reaction liquid containing a styrene-isoprene-styrene triblock copolymer. To this reaction liquid, palladium carbon (supported amount of palladium: 5% by mass) as a hydrogenation catalyst was added in an amount of 5% by mass to the block copolymer, and the reaction was carried out for 10 hours under the condition of a hydrogen pressure of 2 MPa and 150° C. After cooling and pressure release, palladium carbon was removed by filtration, and the filtrate was concentrated and further dried under vacuum, thereby obtaining a styrene-ethylene/propylene-styrene-triblock copolymer (a-I) which is a hydrogenated product of a styrene-isoprene-styrene-triblock copolymer having a weight average molecular weight of 7,900.

In the same manner as in (a-I), a nitrogen-purged and dried pressure-resistant container was charged with 50.0 kg of cyclohexane as a solvent and 420.0 g of sec-butyllithium (10.5% by mass cyclohexane solution) (44.1 g of sec-butyllithium) as an anionic polymerization initiator, heated to 50° C., added with 2.83 kg of styrene and polymerized for 1 hour, subsequently added with 19.81 kg of isoprene and polymerized for 2 hours to obtain a reaction liquid containing a styrene-isoprene diblock copolymer. This reaction liquid was hydrogenated in the same manner as in (a1) to obtain a styrene-ethylene/propylene-diblock copolymer (a-II) which is a hydrogenated product of a styrene-isoprene-diblock copolymer having a weight-average molecular weight of 39,000.

The copolymers (a-I) and (a-II) obtained above were melt-kneaded in a screw of 300 rpm and a kneading temperature of 200° C. using a screw extruder ZSK 26 Maga-Copounder (L/D=54) manufactured by COPERION CO., LTD. to obtain a composition of a styrene-ethylene/propylene-styrene block copolymer (hereinafter also referred to as “SEPS” or “styrene-based elastomer 1”).

The physical properties of the obtained styrene-based elastomer 1 were measured. The results are shown in Table 1.

Production Example 2

A nitrogen-purged and dried pressure-resistant container was charged with 50.0 kg of cyclohexane as a solvent, 0.1905 kg of sec-butyllithium (10.5% by mass cyclohexane solution) as an anionic polymerization initiator, and 0.40 kg of tetrahydrofuran as a Lewis-base, heated to 50° C., added with 6.34 kg of β-farnesene and polymerized for 2 hours, subsequently added with 2.50 kg of styrene and polymerized for 1 hour, and further added with 3.66 kg of butadiene and polymerized for 1 hour. Subsequently, 0.02 kg of dichlorodimethylsilane was added as a coupling agent to this polymerization reaction liquid and reacted for 1 hour, thereby obtaining a reaction liquid containing a poly(ß-farnesene)-polystyrene-polybutacliene-polystyrene-poly(ß-farnesene) pentablock copolymer.

To this reaction liquid, palladium carbon (supported amount of palladium: 5% by mass) as a hydrogenation catalyst was added in an amount of 5% by mass to the block copolymer, and the reaction was carried out for 10 hours under the condition of a hydrogen pressure of 2 MPa and 150° C. After cooling and pressure release, palladium carbon was removed by filtration, and the filtrate was concentrated and further dried under vacuum, thereby obtaining a hydrogenated product of a poly(ß-farnesene)-polystyrene polybutacliene-polystyrene-poly(ß-farnesene) pentablock copolymer having a weight-average molecular weight of 102,000 (hereinafter also referred to as “FSBSF” or “styrene-based elastomer 2”).

The physical properties of the obtained styrene-based elastomer 2 were measured. The results are shown in Table 1.

Raw materials used in Examples and Comparative Examples are as follows.

TABLE 1

| | Kind | Manufacturer or Structure Name | VA ratio (% by mass) | SP value $(cal/cm^3)^{1/2}$ | MFR (g/10 min) | Tensile elongation at −10° C. (%) |
|---|---|---|---|---|---|---|
| (a1) | EV45LX | manufactured by Dow-Mitsui Polychemicals Co., Ltd. Ethylene-vinyl acetate copolymer | 3.6 | 8.60 | 2.5 | 329 |
| | Ultrathene 631 | manufactured by Tosoh Corporation Ethylene-vinyl acetate copolymer | 20 | 8.30 | 1.5 | 544 |
| (a2) | TAFMER MH5010 | manufactured by Mitsui Chemicals, Ltd. Olefin-based elastomer | 0 | 8.15 | 1.1 | 589 |
| | ZF230 (L-LDPE) | manufactured by Tosoh Corporation Linear low density polyethylene (L-LDPE) | 0 | 8.00 | 2.0 | 672 |
| | PC6845 (PP) | manufactured by SunAllomer Ltd. Polypropylene (PP) | 0 | 9.30 | 6.0 | 10 |
| | Styrene-based elastomer-1 | Styrene-ethylene/propylene-block copolymer (SEPS) | 0 | 8.58 | 7.0 | >600 |
| | Styrene-based elastomer-2 | (β-farnesene)-styrene-butadiene-styrene-(β-farnesene) copolymer (FSBSF) | 0 | 8.43 | 15.0 | >600 |

Example 1

As the layer (A), an ethylene-vinyl acetate copolymer (a1) and a thermoplastic resin (a2) were kneaded according to the mix proportion shown in Table 2, and the ethylene-vinyl acetate copolymer (a1) was melted by a single screw extruder GM30-28 (manufactured by GM Engineering Co., Ltd.) at a cylinder temperature of 190° C. and a screw rotation speed of 80 rpm, and the thermoplastic resin (a2) was melted by a single screw extruder GM25-25 (manufactured by GM Engineering Co., Ltd) at a cylinder temperature of 190° C. and a screw rotation speed of 40 rpm, and these were extruded from a T-shaped die T300 (coat hanger die, 300 mm in lip length, manufactured by GM Engineering Co., Ltd.) to obtain a laminated sheet having a width of 30 cm and a thickness of 0.8 mm, in which a layer (A) having a thickness of 0.16 mm and a layer (B) having a thickness of 0.64 mm were laminated. Subsequently, the laminated sheet was wound up by a take-up roll (manufactured by Toyo Seiki Seisaku-sho, Ltd., back roll: diameter 110, L 350 mm, touch roll: diameter 130, L 350 mm).

Five parts by mass of silica, 6 parts by mass of ethylene-vinyl acetate copolymer, and 89 parts by mass of toluene were mixed and sufficiently stirred to prepare a silica dispersion liquid. As the silica, "Nipsil E200A" (content of silicon dioxide=93% by mass, BET specific surface area=140 $m^2/g$) manufactured by Tosoh Silica Corporation was used. As the ethylene-vinyl acetate copolymer, "EVA-FLEX EV45LX" (melt mass flow rate=2.5 g/10 min, vinyl acetate content=46% by mass) manufactured by Dow-Mitsui Polychemicals Co., Ltd. was used.

The surface of the laminated sheet having the layer (A) and the layer (B) on the layer (A) side was coated with the silica dispersion liquid at a rate of 10 $g/m^2$ by a gravure roll, and then heated at 130° C. for 1 minute to dry. This coating and drying operation was repeated three times to produce a waterproof sheet for civil engineering having a thickness of 0.8 mm, in which the layer (B), the layer (A), and the silica-containing layer (thickness 12 μm) were laminated in this order.

Examples 2 to 13 and Comparative Examples 1 and 2

Waterproof sheets for civil engineering were obtained in the same manner as in Example 1 except that the mix proportion of each layer was changed as shown in Table 2. The results are shown in Table 2.

TABLE 2

| | | | VA ratio (% by mass) | SP value (cal/cm$^2$)$^{1/2}$ | Example 1 | Example 2 | Example 3 | Example 4 | Example 5 | Example 6 | Example 7 | Example 8 | Example 9 | Example 10 | Example 11 | Example 12 | Example 13 | Comparative Example 1 | Comparative Example 2 |
|---|---|---|---|---|---|---|---|---|---|---|---|---|---|---|---|---|---|---|---|
| Layer (A) | Mix proportion (part by mass) | (a1) EV45LX | 46 | 8.60 | 0 | 0.45 | 0.45 | 0.50 | 0.10 | 0.20 | 0.30 | 0.35 | 0.55 | 0.45 | 0.45 | 0.50 | 0.20 | 0.55 | 0.05 |
| | | Ultrathene 631 | 20 | 8.30 | 0.45 | 0.25 | 0 | 0.15 | 0.35 | 0.25 | 0.15 | 0 | 0.35 | 0.35 | 0.35 | 0 | 0.25 | 0.45 | 0 |
| | | (a2) TAFMER MH5010 | 0 | 8.15 | 0 | 0 | 0 | 0.30 | 0 | 0 | 0 | 0 | 0 | 0 | 0 | 0 | 0 | 0 | 0 |
| | | ZF230 (L-LDPE) | 0 | 8.00 | 0 | 0 | 0.30 | 0 | 0 | 0 | 0 | 0.20 | 0 | 0 | 0 | 0.45 | 0 | 0 | 0 |
| | | PC6845 (PP) | 0 | 9.30 | 0 | 0 | 0 | 0 | 0 | 0 | 0 | 0 | 0 | 0 | 0 | 0 | 0 | 0 | 0.45 |
| | | Styrene-based elastomer 1 | 0 | 8.58 | 0 | 0 | 0 | 0 | 0 | 0 | 0 | 0 | 0.10 | 0.20 | 0 | 0 | 0.35 | 0 | 0 |
| | | Styrene-based elastomer 2 | 0 | 8.43 | 0.05 | 0.30 | 0.25 | 0 | 0.55 | 0.50 | 0.55 | 0.45 | 0 | 0 | 0.20 | 0 | 0.20 | 0 | 0 |
| | Content ratio of ethylene-vinyl acetate copolymer (a1) in the composition | | | | 45% | 70% | 45% | 70% | 45% | 45% | 45% | 35% | 90% | 80% | 80% | 55% | 45% | 100% | 55% |
| | Content ratio of thermoplastic resin (a2) in the composition | | | | 55% | 30% | 55% | 30% | 55% | 55% | 55% | 65% | 10% | 20% | 20% | 45% | 55% | 0% | 45% |
| | Characteristics | VA ratio of the entire layer (A) (% by mass) (average value in the composition) | | | 9.00 | 25.70 | 20.70 | 28.30 | 11.60 | 14.20 | 16.80 | 16.10 | 32.30 | 27.70 | 27.70 | 25.30 | 14.20 | 34.30 | 25.30 |
| | | Absolute value of difference between SP value of (a1) and SP value of (a2) | | | 0.13 | 0.17 | 0.60 | 0.45 | 0.17 | 0.17 | 0.17 | 0.60 | 0.28 | 0.28 | 0.17 | 0.60 | 0.28 | 0.00 | 0.70 |
| | | Absolute value of difference between SP value of (a1) and SP value of (a2) both considering weighted average | | | 0.13 | 0.06 | 0.40 | 0.39 | 0.06 | 0.00 | 0.07 | 0.30 | 0.10 | 0.11 | 0.04 | 0.60 | 0.09 | 0.00 | 0.70 |
| | | Absolute value of difference between SP values (Maximum SP − minimum SP in the composition) | | | 0.13 | 0.30 | 0.60 | 0.45 | 0.30 | 0.30 | 0.30 | 0.60 | 0.30 | 0.30 | 0.30 | 0.60 | 0.30 | 0.30 | 0.70 |
| | | Mass change rate (%) when immersed in toluene | | | 1.93 | 1.54 | 1.35 | 0.65 | 2.03 | 2.13 | 2.23 | 1.93 | 0.77 | 0.80 | 1.20 | 0.59 | 1.42 | 0.63 | 0.59 |
| Layer (B) | Ultrathene 631 mix proportion (part by mass) | | 20 | 8.30 | 1 | 1 | 1 | 1 | 1 | 1 | 1 | 1 | 1 | 1 | 1 | 1 | 1 | 1 | 1 |
| | VA ratio of the entire layer (B) (% by mass) | | | | 20 | 20 | 20 | 20 | 20 | 20 | 20 | 20 | 20 | 20 | 20 | 20 | 20 | 20 | 20 |
| Overall | Overall thickness of waterproof sheet for civil engineering (mm) | | | | 0.8 | 0.8 | 0.8 | 0.45 | 0.45 | 0.45 | 0.45 | 0.45 | 0.8 | 0.8 | 0.8 | 0.8 | 0.8 | 0.8 | 0.45 |
| | Layer (A) thickness relative to overall thickness (%) | | | | 20 | 20 | 20 | 17 | 22 | 22 | 24 | 23 | 20 | 20 | 20 | 20 | 20 | 20 | 20 |
| | VA ratio (% by mass) | | | | 11.2 | 24.6 | 20.6 | 26.6 | 13.3 | 15.4 | 17.4 | 16.9 | 29.8 | 26.2 | 26.2 | 24.2 | 15.4 | 31.4 | 24.2 |
| Evaluation | Tensile test (−10° C. environment) | Stress (MPa) | | | 33.3 | 40.1 | 40.0 | 43.3 | 45.9 | 46.8 | 44.4 | 42.4 | 34.3 | 34.1 | 34.3 | 37.1 | 37.3 | 32.4 | 34.3 |
| | | Elongation (%) | | | 494 | 534 | 531 | 501 | 576 | 581 | 553 | 543 | 498 | 512 | 509 | 511 | 570 | 479 | 478 |
| | Mortar adhesiveness (4W) | (N/4 cm) | | | 45 | 79 | 93 | 43 | 62 | 84 | 96 | 47 | 94 | 97 | 61 | 25 | 101 | 90 | 19 |

As can be seen from the results in Table 2, the waterproof sheets for civil engineering of the present invention have sufficient strength and elongation even at a low temperature of about −10° C. and have excellent adhesiveness to structures such as tunnels.

The invention claimed is:

1. A waterproof sheet for civil engineering, comprising a layer (A) comprising a composition containing an ethylene-vinyl acetate copolymer (a1) and a thermoplastic resin (a2) other than the ethylene-vinyl acetate copolymer (a1), and a silica-containing layer comprising silica, wherein:

the thermoplastic resin (a2) comprises at least one selected from the group consisting of (β-farnesene)-styrene-butadiene-styrene-(β-farnesene) copolymer (FSBSF), styrene-isobutylene-styrene block copolymer (SIBS), and styrene-ethylene/propylene-styrene block copolymer (SEPS), the content of the ethylene-vinyl acetate copolymer (a1) in the composition is 30 to 95% by mass, the content of the thermoplastic resin (a2) is 5 to 70% by mass, the absolute value of the difference between the SP value of the ethylene-vinyl acetate copolymer (a1) and the SP value of the thermoplastic resin (a2) is less than 0.70 $(cal/cm^3)^{1/2}$, and the content ratio of the structural unit derived from vinyl acetate in the composition is 5% by mass or more and less than 30% by mass.

2. The waterproof sheet for civil engineering according to claim 1, wherein the layer (A) has a mass change rate of 0.6 to 5.0% when immersed in toluene at 23° C. for 1 minute.

3. The waterproof sheet for civil engineering according to claim 1, wherein the thermoplastic resin (a2) has a tensile elongation at −10° C. of 500% or more.

4. The waterproof sheet for civil engineering according to claim 1, wherein the content ratio of the structural unit derived from vinyl acetate in the composition is 7% by mass or more and less than 30% by mass.

5. The waterproof sheet for civil engineering according to claim 1, further comprising a layer (B) containing a synthetic resin, wherein the layer (B) and the layer (A) are adjacent to each other.

6. The waterproof sheet for civil engineering according to claim 5, wherein the synthetic resin is an ethylene-vinyl acetate copolymer.

7. The waterproof sheet for civil engineering according to claim 1, wherein a tensile elongation at break at −10° C. of the waterproof sheet for civil engineering is 480% or more.

8. The waterproof sheet for civil engineering according to claim 1, wherein the content of the ethylene-vinyl acetate copolymer (a1) in the composition is 42 to 85% by mass, the content of the thermoplastic resin (a2) is 15 to 58% by mass.

9. The waterproof sheet for civil engineering according to claim 1, wherein the absolute value of the difference between the SP value of the ethylene-vinyl acetate copolymer (a1) and the SP value of the thermoplastic resin (a2) is less than 0.40 $(cal/cm^3)^{1/2}$.

10. The waterproof sheet for civil engineering according to claim 1, wherein the absolute value of the difference between the SP value of the ethylene-vinyl acetate copolymer (a1) and the SP value of the thermoplastic resin (a2) is less than 0.30 $(cal/cm^3)^{1/2}$.

11. The waterproof sheet for civil engineering according to claim 10, wherein the absolute value of the difference between the SP value of the ethylene-vinyl acetate copolymer (a1) and the SP value of the thermoplastic resin (a2) is less than 0.30 $(cal/cm^3)^{1/2}$.

12. A waterproof sheet for civil engineering, comprising a layer (A) comprising a composition containing an ethylene-vinyl acetate copolymer (a1) and a thermoplastic resin (a2) other than the ethylene-vinyl acetate copolymer (a1), and a silica-containing layer comprising silica, wherein:

the thermoplastic resin (a2) is selected from the group consisting of (β-farnesene)-styrene-butadiene-styrene-(β-farnesene) copolymer (FSBSF), styrene-isobutylene-styrene block copolymer (SIBS), and styrene-ethylene/propylene-styrene block copolymer (SEPS), the content of the ethylene-vinyl acetate copolymer (a1) in the composition is 30 to 95% by mass, the content of the thermoplastic resin (a2) is 5 to 70% by mass, the absolute value of the difference between the SP value of the ethylene-vinyl acetate copolymer (a1) and the SP value of the thermoplastic resin (a2) is less than 0.70 $(cal/cm^3)^{1/2}$, and the content ratio of the structural unit derived from vinyl acetate in the composition is 5% by mass or more and less than 30% by mass.

13. The waterproof sheet for civil engineering according to claim 1, wherein the layer (A) and the silica-containing layer are in direct contact with one another and the silica-containing layer has a thickness of 2 to 100 μm.

14. The waterproof sheet for civil engineering according to claim 1, wherein the silica-containing layer further comprises a resin.

15. The waterproof sheet for civil engineering according to claim 1, wherein:

the layer (A) and the silica-containing layer are in direct contact with one another and the silica-containing layer has a thickness of 2 to 100 μm;

the silica-containing layer further comprises a resin;

a mass ratio of the amount of silica to the amount of resin in the silica-containing layer [(amount of silica)/(amount of resin)] is 30/70 to 70/30; and a content of the silica in the silica-containing layer is 0.15 to 10 $g/m^2$.

16. The waterproof sheet for civil engineering according to claim 14, wherein:

the layer (A) and the silica-containing layer are in direct contact with one another and the silica-containing layer has a thickness of 2 to 100 μm;

the silica-containing layer further comprises a resin;

a mass ratio of the amount of silica to the amount of resin in the silica-containing layer [(amount of silica)/(amount of resin)] is 30/70 to 70/30; and a content of the silica in the silica-containing layer is 0.15 to 10 $g/m^2$.

17. The waterproof sheet for civil engineering according to claim 1, wherein the thermoplastic resin (a2) consists of (β-farnesene)-styrene-butadiene-styrene-(β-farnesene) copolymer (FSBSF).

18. The waterproof sheet for civil engineering according to claim 1, wherein the thermoplastic resin (a2) consists of styrene-ethylene/propylene-styrene block copolymer (SEPS).

* * * * *